Aug. 13, 1968    EIICHI HORI ET AL    3,397,330
MAGNETOHYDRODYNAMIC ELECTRIC POWER GENERATOR

Filed May 4, 1965    2 Sheets-Sheet 1

(a)

(b)

INVENTOR
Eiichi Hori
BY Motokazu Uchida

H. Edward Mestern

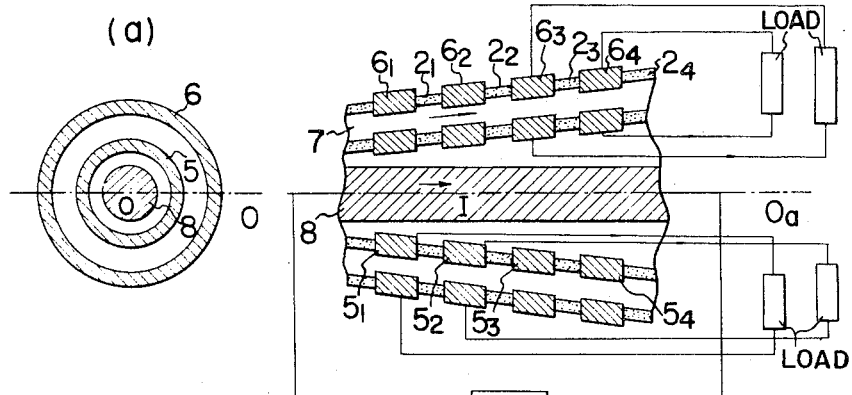
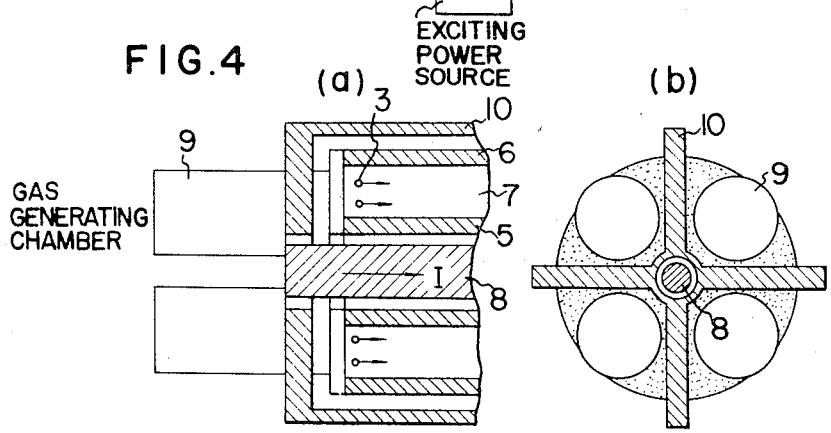
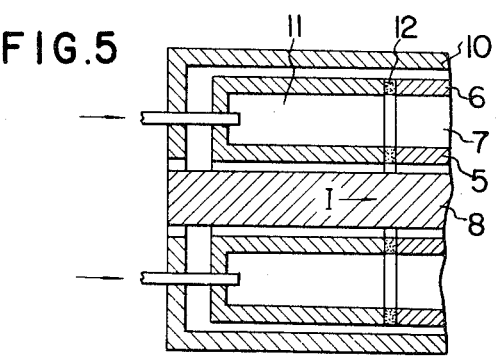

United States Patent Office 3,397,330
Patented Aug. 13, 1968

3,397,330
MAGNETOHYDRODYNAMIC ELECTRIC
POWER GENERATOR
Eiichi Hori, Kokubunji-shi, and Motokazu Uchida,
Setagaya-ku, Tokyo-to, Japan, assignors to Kabushiki Kaisha Hitachi Seisakusho, Chiyoda-ku,
Tokyo-to, Japan, a joint-stock company of Japan
Filed May 4, 1965, Ser. No. 453,141
Claims priority, application Japan, May 6, 1964,
39/25,340
3 Claims. (Cl. 310—11)

ABSTRACT OF THE DISCLOSURE

A magnetohydrodynamic electric power generator which has a longitudinal linear field-exciting conductor, a combination of inner and outer conductive cones or cylinders enclosing said conductor thus forming a passage for a working fluid; further means to apply an exciting current through the conductor to establish a circular exciting magnetic field about the conductor; means for causing the working fluid to flow through the passage and to interact with the magnetic field thus inducing an electromotive force across the passage; and means to lead that force out through the cylinders or cones or circuit leads parallel thereto so as to cause the direction of the resulting current flowing therethrough to produce a flux to aid that produced in the duct by said field exciting conductor.

---

This invention relates to magnetohydrodynamic electric power generators, and more particularly it relates to a new magnetohydrodynamic electric power generator in which the magnetic lines of force produced about a linear field-exciting conductor as a center are caused to interact with a working fluid which is an electrical conductor and flows along the direction of the linear field-exciting conductor, and the electromotive force induced in the working fluid is effectively utilized.

It is a general object of the present invention to overcome certain difficulties accompanying conventional magnetohydrodynamic electric generators as will be hereinafter described fully.

More specifically, it is a prime object of the invention to accomplish magnetohydrodynamic generation of electric power by utilizing the magnetic field created around a linear field-exciting conductor.

Another object of the invention is to cause the circular magnetic field around the field-exciting conductor to interlink and interact with a working fluid flowing through a flow passage between concentric inner and outer cylinders constituting a generator duct thereby to induce an electromotive force.

Still another object of the invention is to cause the direction of electromotive force generated in the above stated manner and flowing in the inner cylinder to be led out in a direction coinciding with the direction of the field-exciting current flowing through the linear field-exciting conductor thereby to utilize the resulting magnetic field for the working fluid flowing through the generator duct.

A further object of the invention is to provide a construction whereby the size of the insulating material wall used for the generator duct wall is reduced to a minimum.

The foregoing objects and other objects and advantages as pointed out hereinafter have been achieved by the present invention according to which, briefly stated, there is provided a magnetohydrodynamic electric power generator comprising a linear field-exciting conductor extending longitudinally, a cylindrical or conical flow passage for an ionized fluid (constituting the working fluid), said flow passage having an annular cross section and extending axially along the field-exciting conductor, means to apply exciting current through the conductor to establish an exciting magnetic field of circular configuration around the conductor as a center, means to cause the ionized fluid to flow through said flow passage and interlink and interact with the magnetic field thereby to induce an electromotive force transversely across the flow passage, and means to lead out said electromotive force.

The nature, principle, and details of the invention will be more clearly apparent from the following detailed description, taken in conjunction with the accompanying drawings in which like parts are designated by like reference characters, and in which:

FIGS. 3a and 3b are respectively a cross sectional view and a fragmentary, longitudinal sectional view showing another preferred embodiment of the invention;

FIGS. 4a and 4b are respectively a fragmentary, longitudinal sectional view showing still another embodiment of the invention; and FIG. 5 is a fragmetnary, longitudinal sectional view showing an example form of a high-temperature gas generator suitable for use in the generator according to the invention.

As conducive to a full appreciation of the nature and utility of the present invention, the following brief consideration of prior magnetohydrodynamic power generators is believed to be useful.

Figure 1:
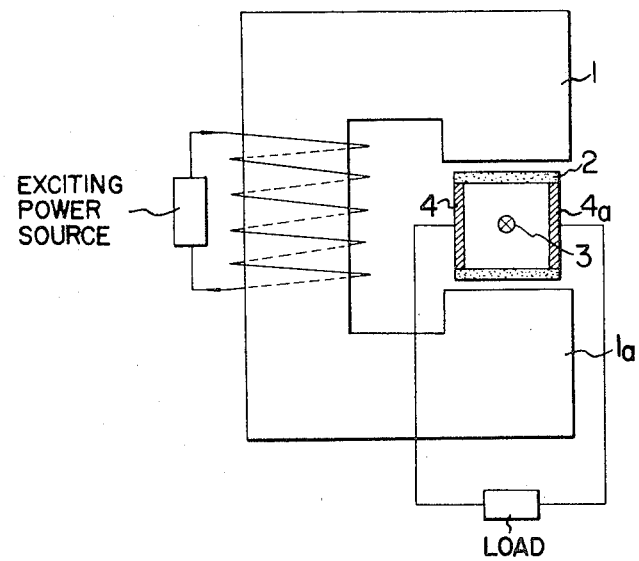
FIG. 1 is a schematic diagram for explaining the principle of a known magnetohydrodynamic electirc power generator.

In a magnetohydrodynamic electric power generator of known type, as shown in FIG. 1, a generator duct 2 made of an electrical insulator material is disposed between the poles 1 and $1_a$ of a magnet with an iron core, and, by causing an ionized gas 3 to flow perpendicularly to the direction 1—$1_a$ of the magnetic field, an electromotive force is induced in the ionized gas and led out through output electrodes 4 and $4_a$.

In this generator, the electrical power density per unit volume is proportional to the square of the applied magnetic field intensity. Accordingly, the higher the magnetic field is, the higher is the electric power which can be generated. However, while it is generally possible to decrease the magnetic resistance of the magnetic circuit by using a magnet with an iron core as shown in FIG. 1 for magnetic fields of up to approximately 30,000 gausses, a tremendous amount of equipment is necessary for producing strong magnetic fields exceeding 30,000 gausses.

On one hand, there is also the technique of using an air core magnet to produce a magnetic field. However, this method as practiced with the conventional generator duct configuration has had the disadvantage of high magnetic resistance and difficulty of reduction to practical use. Furthermore, electrical insulator materials for forming the generator duct 2 are generally good insulators at room temperature, but at high temperatures they tend to possess electrical conductivity and to short-circuit the electromotive force of the ionized gas generated within the generator duct. As a result, the output power is lowered.

In addition, since an electrical insulator material has low thermal conductivity, in general, it is difficult to cool the wall of the above mentioned generator duct from the outside. If the wall is cooled in a forced manner, the resulting great difference in the interior and exterior temperatures of the generator duct will give rise to high thermal stresses, whereby there will be a possibility of the duct wall being damaged. In seeking to eliminate this possibility, there have been proposals such as, for example, the method set forth in Japanese patent publication 22,309/1963, wherein a combination of an insulator material and a good heat conductor is used for the generator duct. Such construction, however, is very complicated. In addition, the method of adding substances such as cesium and potassium as "seed" to the ionized gas in order to increase its electrical conductivity, but if this "seed" deposits on the insulator wall, the insulating property of the generator duct will deteriorate even if a method such as that of Japanese patent publication 22,309/1963 is resorted to.

It is a general object of the present invention to overcome the above mentioned difficulties.

Figure 2:
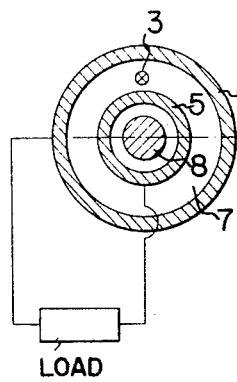
FIGS. 2a and 2b are respectively a cross sectional view and a fragmentary, longitudinal sectional view showing a preferred embodiment of the magnetohydrodynamic electric power generator according to the invention.
Figure 2:
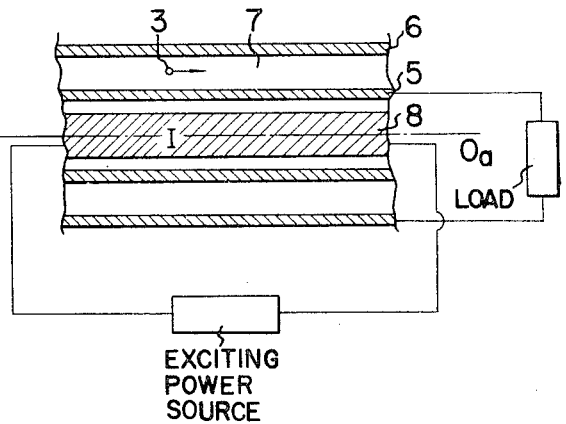

In order to overcome these difficulties encountered in conventional magnetohydrodynamic electric generators, the present invention provides a construction as exemplified by a basic embodiment thereof as shown in FIG. 2. Referring to FIG. 2a, there are provided concentric, cylindrically-shaped output electrodes 5 and 6 both made of an electrically conducting material, the electrode 6 being of larger diameter. The space 7 between the concentric outer and inner electrodes is used as a passage of a generator duct, and through this passage 7 a high-temperature ionized gas 3 is caused to flow in the cylinder axial direction 0 (direction perpendicular to the plane of the drawing as indicated by the mark ⊗).

As indicated in FIG. 2b, there is further provided a conductor 8 along the central axis $0$–$0_a$ of the cylindrical electrodes 5 and 6. When a current I is passed through the conductor 8 in the axial direction, a circular magnetic field which is perpendicular to the axis is produced within the passage 7. Consequently, an electromotive force in a direction perpendicular to the cylinder axis is induced in the ionized gas 3 and can be led out through the electrodes 5 and 6.

Accordingly, by the use of the generator according to the present invention, there is no electrical insulator wall in the cylindrical electrode part corresponding to a generator duct wall. Therefore, there is no problem at high temperatures of an insulator material becoming electrically conducting, and the difficulty due to deterioration of the material strength is overcome. Furthermore, since the exciting flux, that is, the magnetic field, applied to the working fluid is of a circular configuration in the circumferential direction, all parts within the magnetic circuit can be effectively utilized. Moreover, by using the conductor 8 as an exciting coil, its construction can be made simple because of its linear form. Furthermore, if a superconductor is used for the material of this conductor 8, very high electric current can be passed therethrough, whereby the magnetic field applied to the working fluid can also be greatly increased.

In one preferred embodiment of the invention as shown in FIG. 3, there is provided a generator duct consisting essentially of two conical tubes 5 and 6 disposed concentrically with a space 7 therebetween around a conductor 8, the tube 6 being the outer conical tube. More specifically, this generator duct is formed by a combination of a series of inner and outer, ring-shaped output electrodes $6_1$ and $5_1$, $6_2$ and $5_2$, $6_3$ and $5_3$, etc., and a series of inner and outer, ring insulators $2_1$ and $2_{1a}$, $2_2$ and $2_{2a}$, $2_3$ and $2_{3a}$, etc., interposed between and secured to said electrodes in alternate arrangement as illustrated in FIG. 3b, thereby forming inner and outer conical tubes 5 and 6 in concentric disposition.

The widths of the electrodes $6_1$, $6_2$, $6_3$, etc., and $5_1$, $5_2$, $5_3$, etc., are selected to be of the order of $1/10$ of the radial dimension of the passage 7 between the two concentric conical tubes 5 and 6 in order to eliminate the effect of the Hall current of the working fluid. Furthermore, by leading out the output current from each of the electrodes in the same direction as the flow of the exciting current I of the conductor 8, the magnetic field due to these output currents and the magnetic field of the conductor 8 can be used together as an exciting magnetic field for the working fluid flowing through the passage 7 of the generator duct, whereby the magnetic field strength is progressively increased in the downstream direction of the generator duct. Therefore, by forming the generator duct in the shape of a conical tube as shown in FIG. 3b so that the cross sectional radius increases toward the downstream direction, it is possible to apply a uniform magnetic field to the working fluid flowing through the flow passage 7 of the generator duct.

It is known that in a magnetohydrodynamic generator, in general, when an ionized gas of an electrical conductivity $\sigma$ with a flow velocity $u$ passes the generator duct passage of a magnetic field intensity B of a direction perpendicular to the flow, the electrical output power density W obtained from the ionized gas is proportional to $\sigma u^2 B^2$. In general, however, since the temperature of the gas decreases in the downstream direction of the flow path of working fluid, the electrical conductivity $\sigma$ thereof also decreases. Accordingly, the output density decreases in the downstream direction.

This lowering of the output density can be prevented by using, instead of a conical generator duct, the space between concentric inner and outer cylinders as shown in FIG. 2 for the flow passage of the working fluid and causing the output current of each electrode to flow in the direction of the exciting current of the conductor 8, whereby the magnetic flux density (magnetic induction) within the flow passage increases in the downstream direction. Accordingly, the lowering of the temperature of the working fluid and the lowering of the electrical conductivity due thereto are both prevented, whereby the lowering of the output density is prevented.

As a measure to counter the deterioration due to high temperature of the strength and electrically insulating property of a refractory insulator constituting the generator duct, the insulator surface can be easily prevented from being heated to a high temperature by decreasing the spacing between the electrodes as indicated in FIG. 3 and, at the same time, disposing the electrodes to project beyond the insulators into the flow passage.

In a conventional magnetohydrodynamic generator, moreover, since the output voltage is impressed directly on the two ends of each insulator, a large current will flow if the electrically insulating property thereof drops, and the loss also increases. By the arrangement of the present invention, however, since only a voltage corresponding to the Hall electromotive force is impressed on the two ends of each insulator, the loss is small.

Furthermore, since there is produced a magnetic flux density (magnetic induction) gradient wherein the magnetic flux density decreases in inverse proportion to the radius, there occurs a phenomenon whereby the working fluid separates into cations and electrons. Moreover, since this phenomenon has a direction which is reverse to that of the Hall current, it has the effect of counteracting the Hall current.

The particulars of one example generator embodying the invention are as follows:

| | |
|---|---|
| Inner cylinder radius | 5 cm. |
| Outer cylinder radius | 10 cm. |
| Length | 50 cm. |
| Ionized gas | Combustion gas with approximately 1% KOH added thereto as a "seed." |
| Temperature | 2,500 deg. K. |
| Flow velocity | 1,000 metres/sec. |
| Mass flowrate | 2.4 kg./sec. |
| Electrical conductivity of ionized gas | 30 mho/metre. |
| Exciting current through exciting conductor | $5 \times 10^5$ amperes. |

(Note: if a superconductive material is used for the exciting conductor, a current which is at least 6 times the exciting current can be caused to flow.)

| | |
|---|---|
| Magnetic flux density (magnetic induction) | 15,000 gausses. |
| Output voltage | 70 volts. |
| Maximum output | 100 kw. |

In the generator duct of one embodiment of the invention, as shown in FIG. 4a, the flow of an ionized gas 3 introduced from a high-temperature gas generating chamber 9 of can combustion chamber type constituting an ionized gas generating source causes the generation of electromotive force in the ionized gas 3 as said ionized gas flows through a circular magnetic field produced by a linear exciting coil 8, and the resulting electric power can be led out through output electrodes 5 and 6. Furthermore, for the exciting current I flowing through the linear conductor 8, there is provided a return path 10 extending from the other end of the linear conductor 8 outside of and parallel to the outer wall of the generator duct, whereby leakage of the magnetic field to the outside is prevented. An end view in the axial direction of the generator duct above described construction is shown in FIG. 4b.

In another embodiment of the invention as shown in FIG. 5, a high-temperature gas generating chamber 11 is formed in the gas generator of the aforedescribed construction instead of the external, can-type combustion chamber 9. The chamber 11 is defined by the walls of two concentric cylinders which are respectively connected to concentric, cylindrical electrodes 5 and 6 through an insulating wall 12 interposed therebetween as shown in FIG. 5.

The generator duct which functions also as an output electrode means in the above described embodiments of the invention can, of course, be constructed with the use of electrically insulating walls and be provided with output electrodes in the conventional manner. Furthermore, instead of providing a generator duct of a construction of an exciting conductor and concentric cylinders, an arrangement whereby a working fluid is caused to flow, within a generator duct of cylindrical or conical form, along the direction of an exciting conductor can be utilized to obtain electric output from an ionized gas.

The magnetohydrodynamic electric generator according to the present invention as described above has the following advantageous features.

(1) Since a magnetic field due to a linear exciting conductor is utilized, the generator can readily be simplified. Furthermore, by using a material such as a superconductor for the exciting conductor, a large exciting current can be caused to flow therethrough, whereby a high-strength magnetic field and, therefore, a large output can be readily produced.

In addition, since the magnetic flux density (magnetic induction) decreases in proportion to the radial distance from the central exciting conductor, the working fluid exhibits the phenomenon of separating into cations and electrons. Moreover, this phenomenon has the effect of counteracting the Hall current.

(2) Since a structure consisting of two cylinders along the direction of the linear exciting conductor and having the dual function of a generator duct and an output electrode means is used as the working fluid flow passage, almost no electrical insulators are used. Therefore, it is possible to prevent failures due to deterioration of electrical insulating property and strength of insulators at high temperatures, which failures often occur in conventional generator ducts.

(3) By causing the output direction of the induced electromotive force flowing in the inner cylinder of the two cylinders of the generator duct to coincide with the direction of the exciting current flowing through the linear exciting conductor, the circular magnetic field resulting thereby can also be utilized as an exciting magnetic field for the working fluid within the generator duct, whereby the magnetic flux density (magnetic induction) increases in the downstream direction. Therefore, it is possible to eliminate lowering of the output density due to lowering of the electrical conductivity of the ionized gas caused by a drop in the temperature of the gas in the downstream direction as in the case of a conventional magnetohydrodynamic generator.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What we claim is:

1. A magnetohydrodynamic electric power generator comprising a longitudinally extending, linear, field-exciting conductor, a combination of inner and outer cylinders of electrically conducting material enclosing said conductor and forming therebetween a flow passage for a working fluid, means to apply exciting current through said conductor to establish an exciting magnetic field of circular configuration around said conductor as a center, means to cause said working fluid to flow through said passage and interact with said magnetic field thereby to induce an electromotive force transversely across said passage, and means to lead out said electromotive force through said cylinders in a manner to cause the direction of the resulting current flowing through the inner cylinder to coincide with the direction of said exciting current flowing through said linear field-exciting conductor.

2. A magnetohydrodynamic electric power generator comprising a longitudinally extending, linear, field-exciting conductor, a combination of inner and outer cones of electrically conducting material enclosing said conductor and forming therebetween a flow passage for a working fluid means to apply exciting current through said conductor to establish an exciting magnetic field of circular configuration around said conductor as a center, means to cause said working fluid to flow through said passage and interact with said magnetic field thereby to induce an electromotive force transversely across said passage, and means to lead out said electromotive force through said cones in a manner to cause the direction of the resulting current flowing through the inner cone to coincide with the direction of said exciting current flowing through said linear field-exciting conductor.

3. A magnetohydrodynamic electric power generator comprising a longitudinally extending, linear field-exciting conductor, a generator duct consisting essentially of a combination of inner and outer cylinders and cones, respectively, of electrically conducting material enclosing said conductor and forming therebetween a flow passage for a working fluid, means to apply exciting current through said conductor to establish an exciting magnetic field of circular configuration around said conductor as a center, means to cause said working fluid to flow through said passage and interact with said magnetic field thereby to induce an electromotive force transversely across said passage, and means to lead out said electromotive force through circuit leads parallel thereto so as to cause the direction of the resulting current flowing therethrough to produce a flux to aid that produced in the duct by said field-exciting conductor.

References Cited

UNITED STATES PATENTS

| | | | |
|---|---|---|---|
| 3,243,713 | 3/1966 | Brahm | 310—11 X |
| 3,260,867 | 7/1966 | Hurwitz et al. | 310—11 |
| 3,309,546 | 3/1967 | Boll | 310—11 |

FOREIGN PATENTS

| | | |
|---|---|---|
| 1,015,170 | 12/1965 | Great Britain. |
| 1,412,333 | 8/1965 | France. |

MILTON O. HIRSHFIELD, *Primary Examiner.*

D. X. SLINEY, *Assistant Examiner.*